United States Patent
Beser

(10) Patent No.: US 8,089,944 B2
(45) Date of Patent: *Jan. 3, 2012

(54) END-POINT AWARE RESOURCE RESERVATION PROTOCOL PROXY

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,064

(22) Filed: Apr. 7, 2011

(65) Prior Publication Data

US 2011/0182288 A1 Jul. 28, 2011

Related U.S. Application Data

(63) Continuation of application No. 12/715,000, filed on Mar. 1, 2010, now Pat. No. 7,944,902, which is a continuation of application No. 10/857,018, filed on Jun. 1, 2004, now Pat. No. 7,701,914.

(60) Provisional application No. 60/474,922, filed on Jun. 3, 2003.

(51) Int. Cl.
*H04Q 7/28* (2006.01)

(52) U.S. Cl. .......................... 370/341; 370/431; 455/450

(58) Field of Classification Search .................. 370/329, 370/341, 431; 455/450
See application file for complete search history.

(56) References Cited

U.S. PATENT DOCUMENTS

| 6,278,712 | B1 | 8/2001 | Takihiro et al. | |
|---|---|---|---|---|
| 6,718,179 | B1 | 4/2004 | Forssell et al. | |
| 6,967,927 | B1 | 11/2005 | Dugeon et al. | |
| 6,973,311 | B2 * | 12/2005 | Yi-Bing et al. | 455/436 |
| 7,054,638 | B2 * | 5/2006 | Rune et al. | 455/450 |
| 7,170,879 | B2 * | 1/2007 | Kim | 370/338 |
| 7,181,532 | B1 | 2/2007 | Chan | |
| 7,295,511 | B2 * | 11/2007 | Sharma et al. | 370/217 |
| 7,366,155 | B1 | 4/2008 | Leppisaari et al. | |
| 7,372,833 | B2 * | 5/2008 | Kyronaho et al. | 370/331 |
| 7,701,914 | B1 * | 4/2010 | Beser | 370/341 |
| 7,729,293 | B2 | 6/2010 | Suzuki et al. | |
| 7,944,902 | B2 * | 5/2011 | Beser | 370/341 |
| 2002/0085494 | A1 | 7/2002 | Seddigh et al. | |
| 2002/0181468 | A1 | 12/2002 | Lucidarme et al. | |
| 2004/0008632 | A1 | 1/2004 | Hsu et al. | |
| 2004/0196825 | A1 | 10/2004 | Scholte | |
| 2010/0158034 | A1 | 6/2010 | Beser | |

OTHER PUBLICATIONS

PacketCable™ Dynamic Quality-of-Service Specification, PKT-SP-DQOS-105-021127, Nov. 27, 2002, 212 pages.

* cited by examiner

*Primary Examiner* — Nhan Le
(74) *Attorney, Agent, or Firm* — Harrity & Harrity, LLP

(57) ABSTRACT

A method performed by a first network device may include receiving a request for a resource from an end-point device and acknowledging the request for the resource to the end-point device. The method may also include receiving a resource coordination message from a second network device and transmitting a return resource coordination message to the second network device.

20 Claims, 7 Drawing Sheets

END-POINT AWARE RESOURCE RESERVATION PROTOCOL PROXY

RELATED APPLICATIONS

This application is a continuation of U.S. patent application Ser. No. 12/715,000, filed Mar. 1, 2010, which is a continuation of U.S. patent application Ser. No. 10/857,018, filed Jun. 1, 2004 (now U.S. Pat. No. 7,701,914), which claims priority under 35 U.S.C. §119 based on U.S. Provisional Application No. 60/474,922, filed Jun. 3, 2003. The contents of all these applications are incorporated herein by reference.

BACKGROUND

1. Field of the Invention

Systems and methods consistent with the principles of the invention relate generally to network communication protocols, and more particularly, to a resource reservation protocol facilitated by a network device in a network.

2. Description of Related Art

In certain network-based applications, it may be desirable to achieve a specified Quality of Service (QoS), that is, a guaranteed network bandwidth and availability for such applications. To obtain this specified QoS, end-point devices (i.e., users of the application) may interact with network devices (e.g., routers, gateways, etc.) to reserve sufficient resources to guarantee that the application will have the specified QoS. Such end-point devices may be "originating" devices that originate communication or "terminating" devices with whom communication is sought.

Some network-based applications may need to perform "symmetric" resource reservation for the applications to function properly. In such applications, both the originating and terminating end-point devices may reserve resources from network devices to ensure a sufficient end-to-end QoS. Voice over Internet Protocol (VoIP) is one example of an application for which end-point devices need to symmetrically reserve resources (e.g., bandwidth), for example, from routing network devices. The end-point devices may coordinate this resource reservation using a Resource reservation Protocol (RSVP), for example the RSVP specified by the Internet Engineering Task Force (IETF).

Around the time of this symmetric resource reservation by the end-point devices, the associated network devices may be authorized to use, for example, the network between the network devices. Such authorization may use Packet-Cable™-defined constructs called "gates" (and gate-related messages) to control or "authorize" access by the network devices (and end-point devices) to the network on a per-flow basis. Such an arrangement, however, may result in a network device on one end (e.g., the terminating end of the communication) allocating resources to its end-point device without making sure that the network device on the other end (i.e., the originating end of the communication) is authorized.

Therefore, there exists a need to better coordinate the reservation of resources in a network.

SUMMARY

Systems and methods consistent with the principles of the invention address this and other needs by terminating a resource request from an end-point device and waiting for a coordination message from a network device. When the coordination message is received, the resources requested by the end-point device may be committed.

In accordance with one aspect of the invention, a method may include receiving a request for a resource and terminating the request for the resource. The method may also include receiving a resource coordination message and assigning the resource identified by the request after receiving the resource coordination message.

In another implementation consistent with principles of the invention, a method performed by a first network device may include receiving a request for a resource from an end-point device and acknowledging the request for the resource to the end-point device. The method may also include waiting for a resource coordination message from a second network device and transmitting a return resource coordination message to the second network device. The method may further include completing the reservation of the resource.

In a further implementation consistent with principles of the invention, a first network device may be configured to receive a first resource reservation protocol (RSVP) message requesting that resources be committed, transmit a second RSVP message to a sender of the first RSVP message, receive a third RSVP message from a second network device, and commit the resources requested by the first RSVP message after receiving the third RSVP message.

In yet another implementation consistent with principles of the invention, a computer-readable medium may include instructions for acknowledging receipt of a first resource reservation protocol (RSVP) message with a first return RSVP message and instructions for delaying until a second RSVP message is received. The medium may also include instructions for sending a third RSVP message after the second RSVP message is received and instructions for committing one or more resources requested by the first RSVP message after the second RSVP message is received.

In another implementation consistent with the principles of the invention, a first network device is configured to receive a request to reserve resources and transmit a first resource reservation protocol (RSVP) message to a second network device requesting that first resources be committed. The first network device is further configured to receive a second RSVP message from the second network device requesting that second resources be committed, commit the second resources based on receipt of the second RSVP message, receive a third RSVP message from the second network device indicating that the first resources were committed, and acknowledge reservation of the requested resources.

In a further implementation consistent with the principles of the invention, a first network device is configured to receive a message that instructs the first network device whether to act as an originating network device or a terminating network device, and exchange resource reservation protocol (RSVP) messages with a second network device to reserve resources for a communication between a first device associated with the first network device and a second device associated with the second network device.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention may perform improved RSVP signaling. For example, such systems and methods may terminate a resource request from an end-point device and wait for a coordination message from a network device. When the coordination message is received, the resources requested by the end-point device may be committed.

Exemplary System

Figure 1:
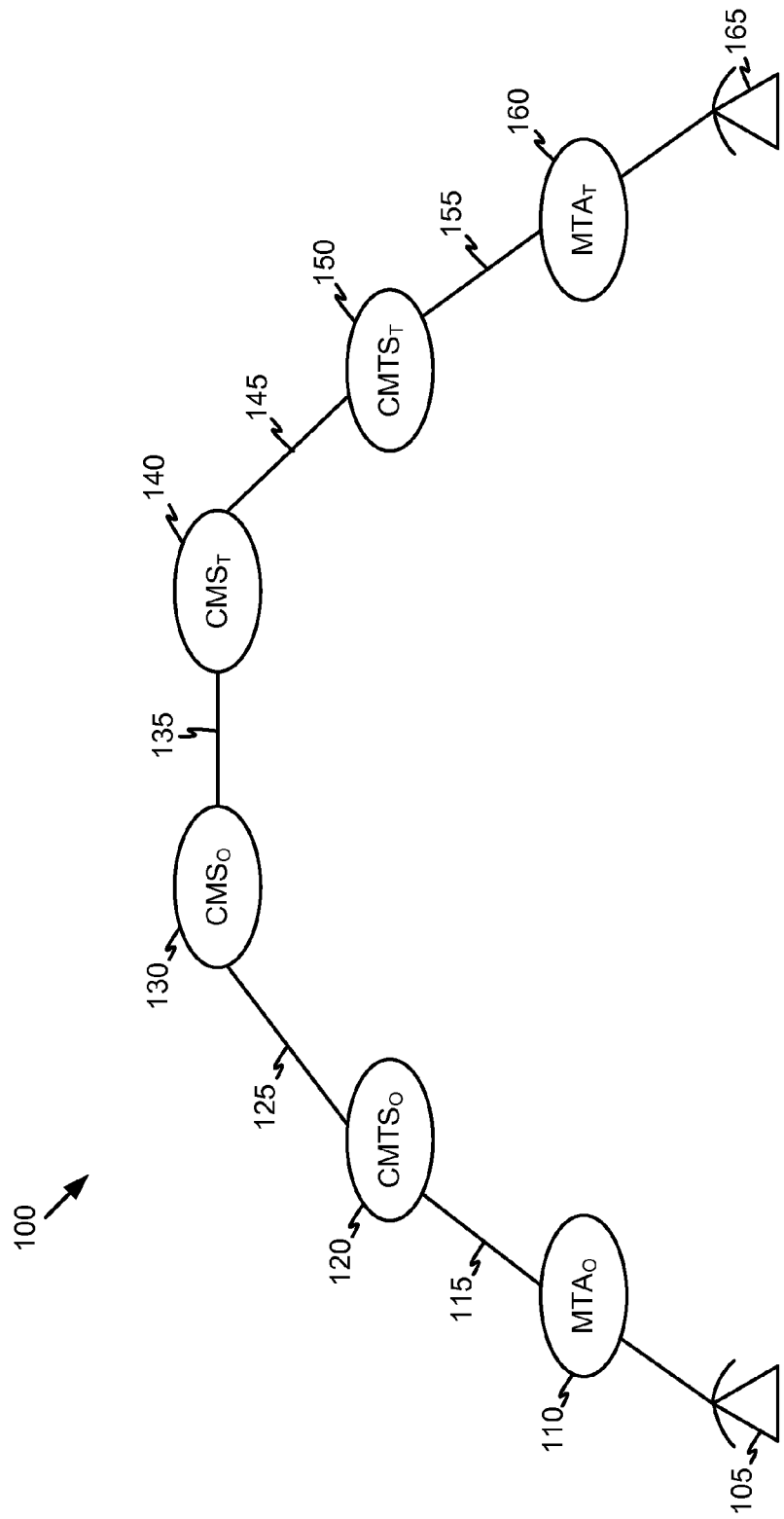
FIG. 1 is a diagram illustrating an exemplary system in which concepts consistent with aspects of the invention may be implemented.

FIG. 1 is a diagram illustrating an exemplary system 100 in which concepts consistent with aspects of the invention may be implemented. System 100 may include a multimedia terminal adapter (MTA) 110, a cable modem termination system (CMTS) 120, a call management server (CMS) 130, a CMS 140, a CMTS 150, and an MTA 160. MTAs 110/160 may be respectively connected to CMTSs 120/150 by radio frequency (RF) links 115/155, such as those found in a cable modem network. CMTSs 120/150 may be respectively connected to CMSs 130/160 by links 125/145 that support Internet Protocol (IP) communication. CMS 130 may be connected to CMS 140 by a backbone 135, such as a portion of a public switched telephone network (PSTN) or other backbone network.

For the discussion to follow, system 100 will be described with respect to a VoIP application performed over system 100. Although system 100 may be used to facilitate other applications, VoIP is one example of an application that entails symmetric resource reservation. For the purposes of discussion, a telephone device 105 (e.g., a conventional telephone or an IP-based telephone) connected to MTA 110 will be assumed to originate a telephone call that will terminate with a telephone device 165 connected to MTA 160. Hence, MTA 110, CMTS 120, and CMS 130 may all be referred to as "originating" devices, and CMS 140, CMTS 150, and MTA 160 may all be referred to as "terminating" devices. The structure and operation of typical MTA, CMTS, and CMS devices will be understood by those skilled in the communication arts, and only those deviations from such typical devices will be described.

MTA 110 is the originating end-point device of system 100. Although not shown, MTA 110 may include, or be connected to, a cable modem (CM) configured to communicate with CMTS 120 under one of the Data over Cable Service Interface Specifications (DOCSIS) (e.g., DOCSIS 1.1 or DOCSIS 2.0). MTA 110 may function to communicate information between the connected telephone device 105 and CMTS 120. MTA 110 may also attempt to reserve resources (e.g., bandwidth) from CMTS 120 for the call from connected telephone device 105.

CMTS 120 may be configured to facilitate communication between MTA 110 and CMS 130. CMTS 120 may be configured to allocate resources (e.g., bandwidth) to MTA 110. CMTS 120 may also be configured to receive gate authorization from CMS 130.

CMS 130 may be configured to set up calls for MTA 110. For example, CMS 130 may be configured to communicate with MTA 110 to set up calls, arrange gate authorization for CMTS 120, and arrange for resources on backbone 135.

MTA 160, CMTS 150, and CMS 140 may be similarly configured to MTA 110, CMTS 120, and CMS 130, respectively. The structure and operation of these devices will not be repeated for this reason.

Exemplary Signaling Diagram

Figure 2:
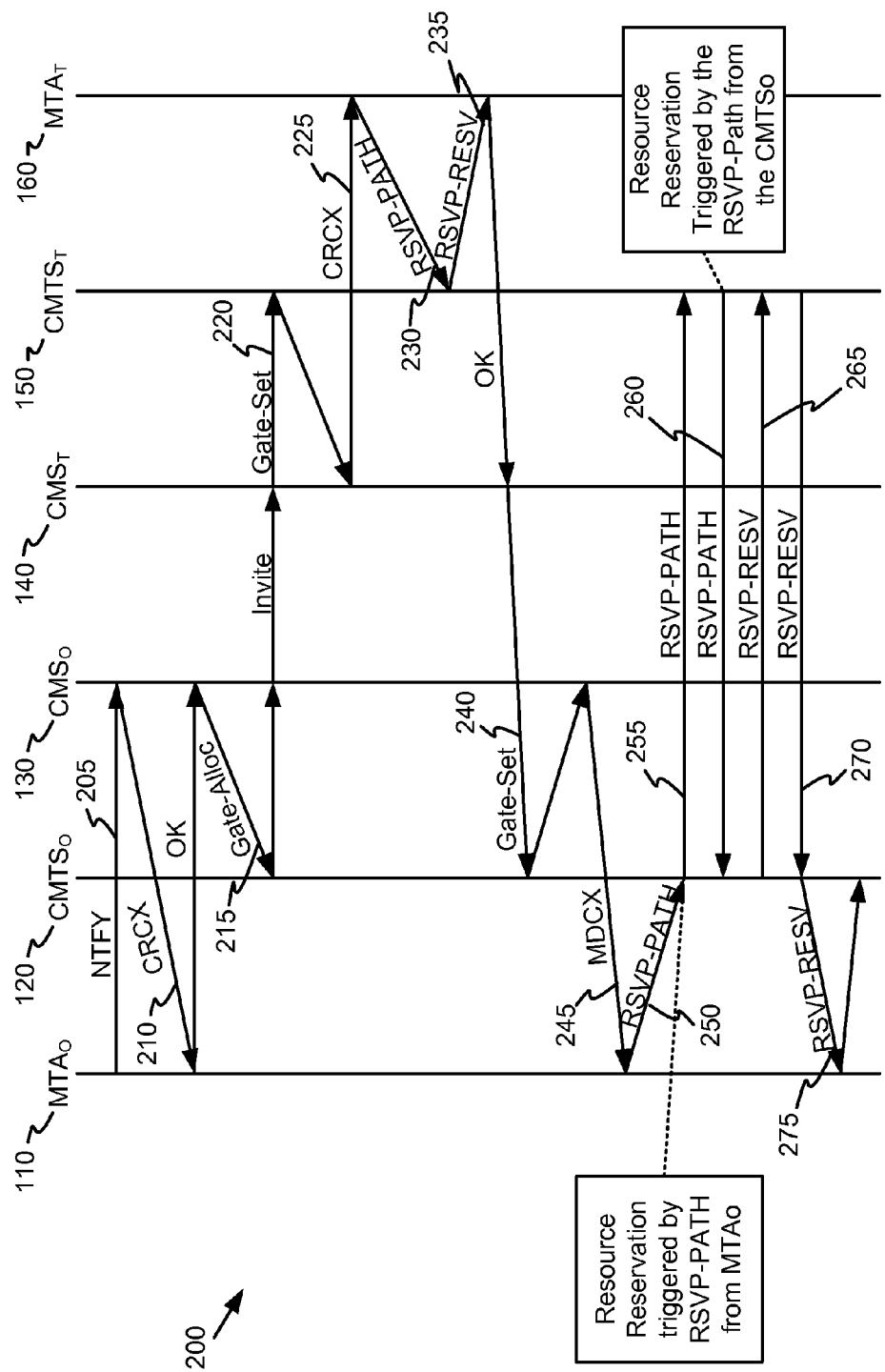
FIG. 2 is an exemplary signaling diagram of the system of FIG. 1 according to an implementation consistent with the principles of the invention.

FIG. 2 is an exemplary signaling diagram 200 of system 100 according to one implementation consistent with the principles of the invention. Certain signals may not be labeled with reference numbers, for ease of explanation. These unlabeled signals are typically acknowledgments of earlier signals, and may not merit individual discussion. A more comprehensively described signaling scheme (including RSVP signaling) that may be employed in system 100 appears in the PacketCable™ Dynamic Quality-of-Service specification (PKT-SP-DQOS-I05-021127), 5th release, Nov. 27, 2002, which is incorporated by reference herein.

MTA 110 may begin by sending a notify (NTFY) message 205 to CMS 130 to indicate digits pressed to originate a call. CMS 130 may respond with a create connection (CRCX) message 210. In response to signaling information from MTA 110, CMS 130 may send a gate allocation (Gate-Alloc) message 215 to CMTS 120 to check the current resource (e.g., number of call allocations requested) consumption of MTA 110 by consulting CMTS 120. Upon response from CMTS 120, originating CMS 130 may send an invite message to terminating CMS 140.

CMS 140 may send CMTS 150 a gate setting (Gate-Set) message 220 to authorize CMTS 150 to admit the new call connection. A Gate-Set message, such as Gate-Set message 220, may instruct a CMTS to act as either an originating CMTS or a terminating CMTS. In this case, Gate-Set message 220 may instruct CMTS 150 to act as a terminating CMTS. In another implementation, another type of message (other than a Gate-Set message) may be used to instruct a CMTS as to whether to act as an originating CMTS or a terminating CMTS. The alternative messaging may even include an object within an RSVP_PATH message, such as RSVP_PATH message 250 for origination assignment and RSVP_PATH message 230 for termination assignment.

After acknowledgment from CMTS 150, CMS 140 may send terminating MTA 160 a CRCX message 225 to create a connection. At this point, MTA 160 may attempt to reserve resources (e.g., bandwidth) from CMTS 150 for the upcoming call by sending an RSVP_PATH message 230 to CMTS 150. CMTS 150 may immediately send a return RSVP_RESV message 235 to MTA 160. Receipt of RSVP_RESV message 235 by MTA 160 indicates to MTA 160 that the requested resources have been successfully reserved. In one implementation consistent with the principles of the invention, CMTS 150 does not, however, actually reserve the requested resources end-to-end, but instead only reserves the local resources between the MTA 160 and CMTS 150 when it sends RSVP_RESV message 235 to MTA 160.

Such a reply to MTA 160 with RSVP_RESV message 235 may have the following implications. MTA 160 may, upon receipt of RSVP_RESV message 235, assume that CMTS 150 has coordinated resource reservations with CMTS 120, when CMTS 150 has not in fact performed such coordination. From the perspective of MTA 160, the signaling is proceeding regularly. By immediately returning RSVP_RESV message 235, but not committing resources, CMTS 150 avoids the potential problem of committing resources before it is sure that CMTS 120 is authorized by CMS 130 (e.g., via gate setting message 240) for the call connection.

After an acknowledgment from MTA 160, CMS 130 may send CMTS 120 a Gate-Set message 240 to authorize CMTS 120 to admit the new call connection. As described above, Gate-Set message 240 (or another type of message) may instruct CMTS 120 to act as either an originating CMTS or a terminating CMTS. In this case, Gate-Set message 240 may instruct CMTS 120 to act as an originating CMTS. CMS 130 may then send MTA 110 a MDCX message that instructs the MTA to modify its connection and reserve the end-to-end resources.

MTA 110 may then seek to reserve sufficient resources for the call by sending CMTS 120 an RSVP_PATH message 250. CMTS 120 may attempt to coordinate this resource reservation with CMTS 150 by sending an RSVP_PATH message 255. Upon receiving RSVP_PATH message 255, CMTS 150 may reserve the resources that it did not reserve when requested by MTA 160 via RSVP_PATH message 230. CMTS 150 may reserve the resources that were requested earlier by MTA 160 at this time, because receipt of RSVP_PATH message 255 from CMTS 120 implies that CMTS 120 is authorized by CMS 130 for the call connection.

CMTS 150, instead of immediately sending an RSVP_RESV message to CMTS 120, may start to reserve resources in the reverse direction by sending RSVP_PATH message 260 to CMTS 120. Upon receipt of RSVP_PATH message 260, CMTS 120 may reserve the resources that were requested, and confirm the reservation of the resources in the reverse path using RSVP_RESV message 265. Upon receipt of RSVP_RESV message 265, CMTS 150 replies to the earlier received RSVP_PATH message 260 confirming that the resources are reserved, and starts the resources reservation of the path via RSVP_RESV message 270 to CMTS 120. This RSVP_RESV message 270 completes the "handshake" between CMTS 120 and CMTS 150 that coordinates symmetric resource reservation for the call between MTA 110 and MTA 160. Around this time, CMTS 120 may send a return RSVP_RESV message 275 to MTA 110 to indicate that the end-to-end resources requested by RSVP_PATH message 250 have been successfully reserved.

Subsequent signaling associated with a call between MTA 110 and MTA 160 (or more precisely between associated telephone devices 105 and 165) in system 100 may be described in the PacketCable™ Dynamic Quality-of-Service specification (PKT-SP-DQOS-I05-021127), 5th release, Nov. 27, 2002, which is incorporated by reference herein. Because it may be performed in a typical manner, such subsequent signaling will not be explicitly described herein.

Exemplary Protocol Process

Figure 3A:
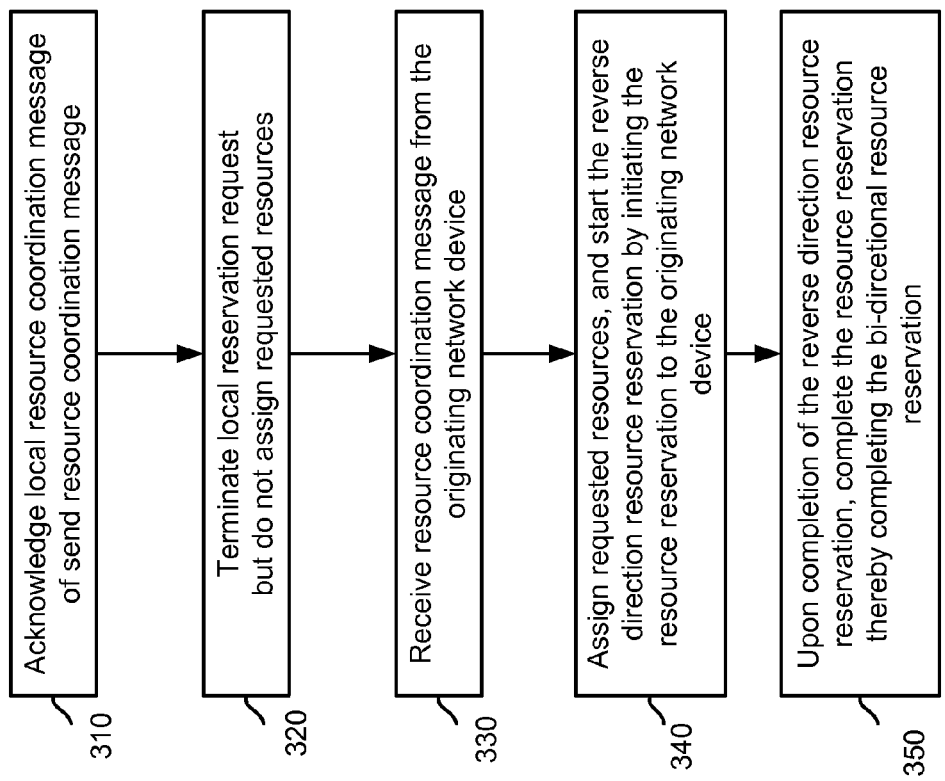
FIGS. 3A and 3B are exemplary messaging processes consistent with the principles of the invention.
Figure 3B:
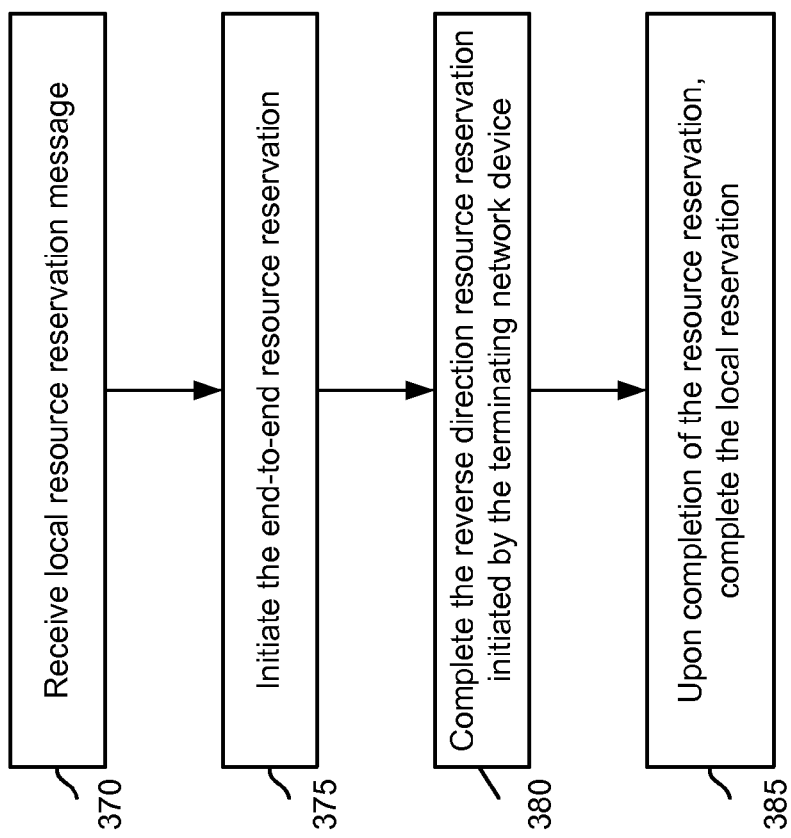

FIGS. 3A and 3B are exemplary RSVP processes which may vary depending on whether the CMTS is a terminating one or originating one. FIG. 3A illustrates RSVP processing in the case of a terminating CMTS. FIG. 3B illustrates RSVP processing in the case of an originating CMTS.

The RSVP processing of FIG. 3A may be performed by a termination network device, such as terminating CMTS 150. Terminating CMTS 150 may perform other actions in setting up an application session (e.g., a VoIP call), but the processing of FIG. 3A concentrates on the RSVP portion of such signaling.

In FIG. 3A, processing may begin by receiving a local resource reservation request [act 310]. In one implementation consistent with the principles of the invention, terminating CMTS 150 may receive an RSVP_PATH message 230 from terminating MTA 160. Processing may continue by terminating the local resource reservation request and assigning/committing local resources, but not assigning/committing the requested end-to-end resources [act 320]. Terminating CMTS 150, for example, may send return RSVP_RESV message 235 to MTA 160. Terminating CMTS 150 may not, at this time, commit the end-to-end resources requested by MTA 160 in the resource reservation request (e.g., RSVP_PATH message 230). Instead, terminating CMTS 150 may wait until it receives a resource coordination message from an originating network device before committing the requested resources.

Processing may continue by receiving such a resource coordination message from an originating network device, such as CMTS 120 [act 330]. For example, terminating CMTS 150 may receive RSVP_PATH message 255 from originating CMTS 120.

Instead of completing the resource reservation that is initiated by the originating network device, terminating CMTS 150 starts resource reservation in the reverse direction [act 340]. Upon completion of the resource reservation in the reverse direction, terminating CMTS 150 completes the resource reservation that the originating network device started [act 350].

The RSVP processing of FIG. 3B may be performed by an originating network device, such as originating CMTS 120. Originating CMTS 120 may perform other actions in setting up an application session (e.g., a VoIP call), but the processing of FIG. 3B concentrates on the RSVP portion of such signaling.

In FIG. 3B, processing may begin by receiving a local resource reservation request [act 370]. In one implementation consistent with the principles of the invention, originating CMTS 120 may receive an RSVP_PATH message 250 from originating MTA 110. Processing may continue by initiating an RSVP_PATH message 255 to reserve the resources [act 375].

Upon receipt of the reverse direction RSVP_PATH message 260, originating CMTS 120 may complete the resource reservation of the reverse direction by initiating RSVP_RESV message 265 [act 380]. Upon completion of the resource reservation by originating CMTS 120, which was started by the reception of RSVP_RESV message 270, originating CMTS 120 may complete the local reservation via RSVP_RESV message 275 to originating MTA 110.

Exemplary Generalized System

Systems and methods consistent with the principles of the invention are not limited to a VoIP application over a cable modem system, as illustrated in FIG. 1. Rather, systems and methods consistent with the principles of the invention are applicable to any system/method that needs end-to-end QoS, and more generally, to any application and system in which bi-directional resources should be synchronously reserved by network devices, such as routers.

Figure 4:
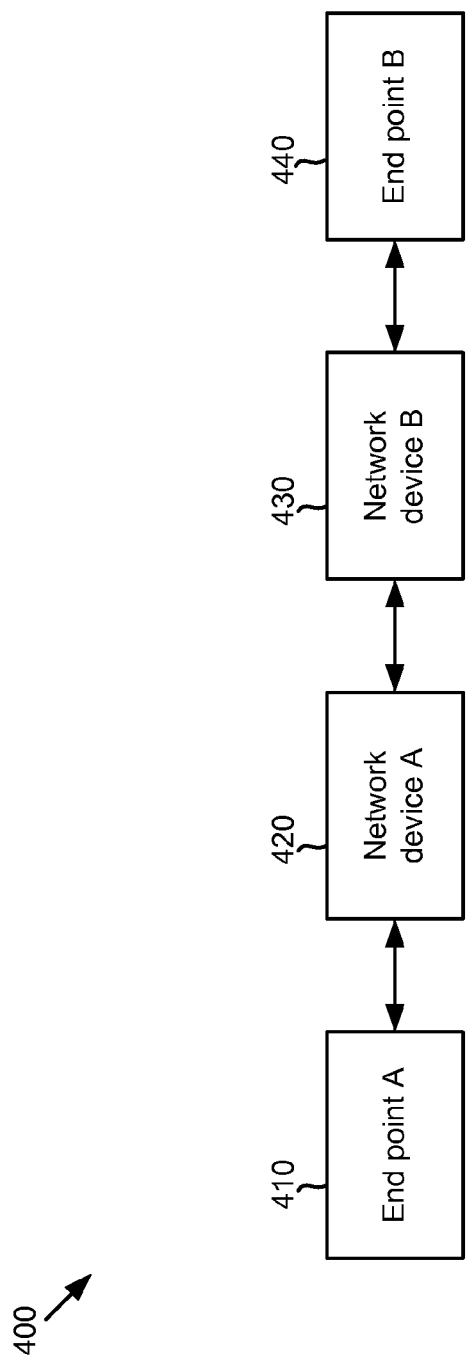
FIG. 4 is a diagram illustrating an exemplary generalized system in which concepts consistent with aspects of the invention may be implemented.

FIG. 4 is a diagram illustrating an exemplary generalized system 400 in which concepts consistent with aspects of the invention may be implemented. System 400 may include an end-point device (EPD) A 410, a network device (ND) A 420, a ND B 430, and an EPD B 440. Although not shown in FIG. 4, NDs 420 and 430 may communicate over a network, and such network communication by NDs 420 and 430 may be coordinated/controlled by one or more coordinating devices (e.g., controllers).

EPDs 410 and 440 may be configured to request resources from respective NDs 420 and 430 using an RSVP protocol. EPDs 410 and 440 also may be configured to communicate after being assigned such resources. It should be noted, however, that the application in which EPDs 410 and 440 communicate need not be VoIP. Communication between EPDs 410 and 440 may involve other protocols, such as the hypertext transfer protocol (HTTP) or the H.323 ITU-T recommendation. EPDs 410 and 440 may, but need not, be MTAs; they may also be other network communication devices that are P2P (peer-to-peer) applications, such as gaming applications, video conferencing applications, etc.

NDs 420 and 430 may be configured to assign/commit resources to EPDs 410 and 440, and coordinate between themselves to symmetrically assign/commit such resources. NDs 420 and 430 may be network devices, such as switches or routers. Although arranged similar to CMTSs 120 and 150, either one of NDs 420 and 430 may be on, for example, the terminating side of a network communication session.

Exemplary Generalized Signaling Diagram

Figure 5:
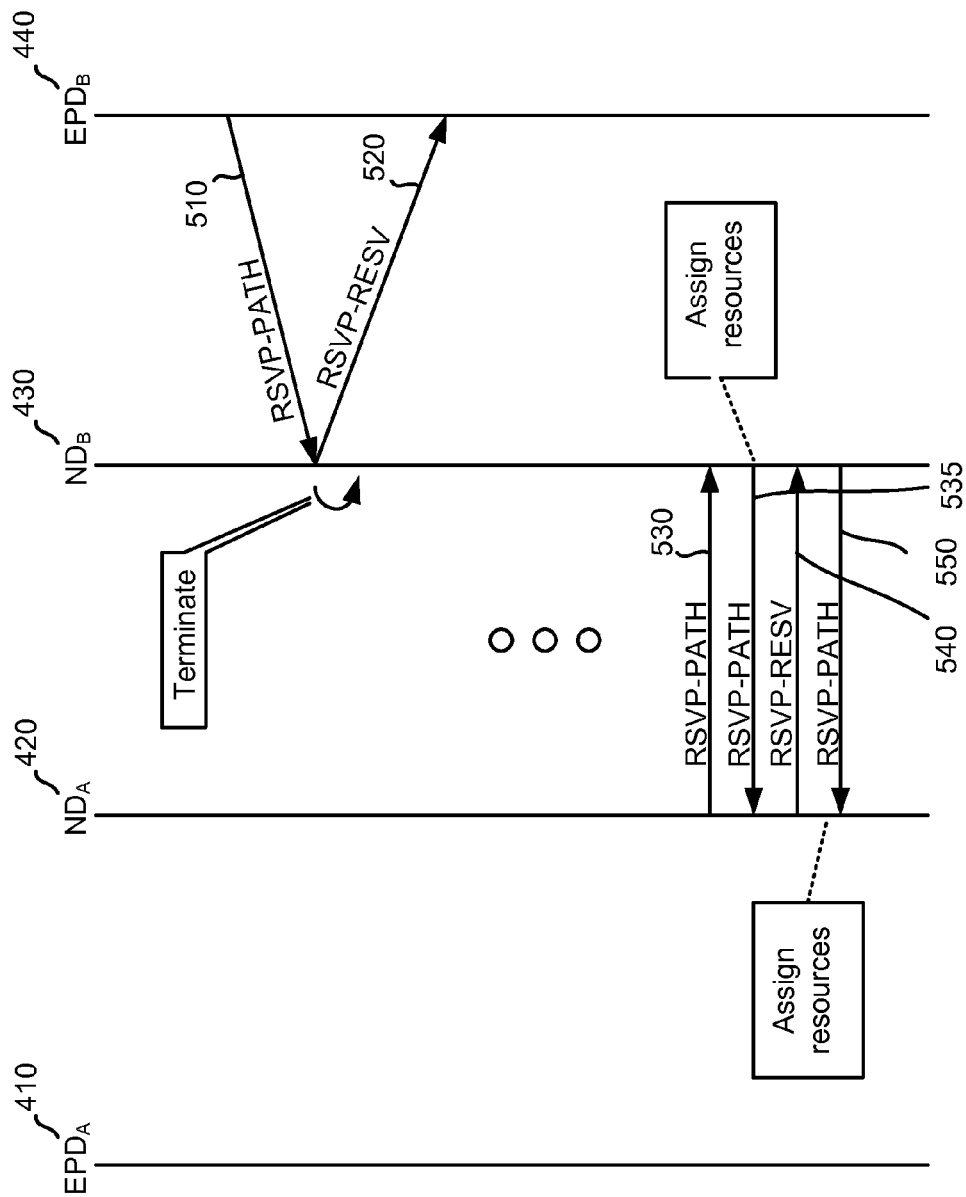
FIG. 5 is an exemplary generalized signaling diagram of the generalized system of FIG. 4 according to an implementation consistent with the principles of the invention.

FIG. 5 is an exemplary generalized signaling diagram of generalized system 400 according to an implementation consistent with the principles of invention. Although system 400 may perform other communication/signaling, only a certain portion of an RSVP signaling exchange is illustrated in FIG. 5 for clarity of explanation with respect to generalized system 400.

EPD 440 may attempt to reserve resources from ND 430 for a communication with EPD 410 by sending an RSVP_PATH message 510 to ND 430. ND 430 may terminate the resource request by sending a return RSVP_RESV message 520 to EPD 440. Receipt of RSVP_RESV message 520 by EPD 440 may indicate to EPD 440 that the requested resources have been successfully reserved.

In one implementation consistent with the principles of the invention, ND 430 does not, in fact, reserve the requested resources when it sends RSVP_RESV message 520 to EPD 440. Rather, ND 430 waits for a coordinating RSVP_PATH message 530 from ND 420. Upon receiving RSVP_PATH message 530, ND 430 may assign/commit the resources that it did not when requested by EPD 440 via RSVP_PATH message 510.

ND 430 may send a coordinated RSVP_PATH message 535 to ND 420. Thus, ND 430 may wait/delay until it receives RSVP_RESV message 540 from ND 420 to send its RSVP_RESV message 550 to communicate the reverse direction resource reservation completion from its end (terminating) of system 400.

The reception of RSVP_RESV message 550 indicates the completion of bi-directional resource reservation to ND 420. Upon receiving RSVP_RESV message 550, ND 420 may reserve any resources previously requested by EPD 410. ND 420 may confirm reservation of its resources for the call by sending a return RSVP_RESV message (not shown) to ND 430 that completes the RSVP "handshake" between ND 420 and ND 430.

Exemplary Generalized Protocol Process

Figure 6:
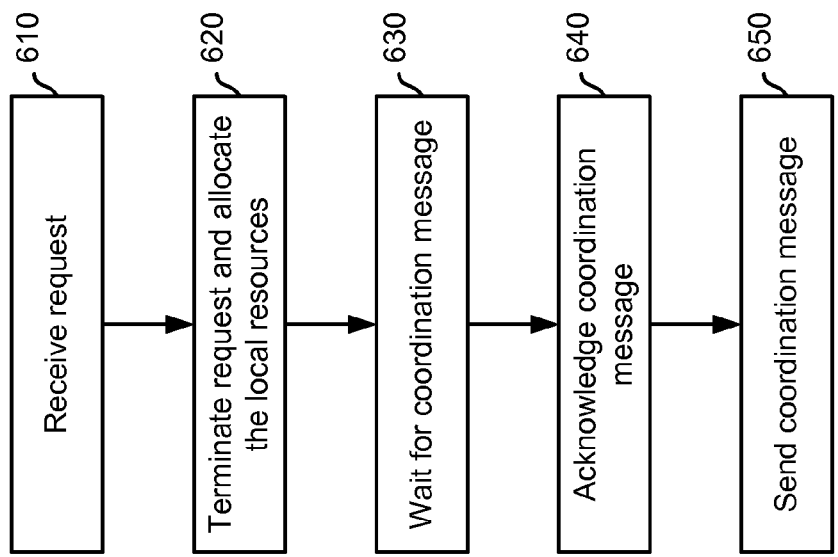
FIG. 6 is an exemplary generalized messaging process consistent with the principles of the invention.

FIG. 6 is an exemplary generalized RSVP process 600 consistent with the principles of the invention. Process 600 may be performed by one network device, such as ND 430. It should be noted that the performing network device (e.g., ND 430) may be an originating ND or a terminating ND in the context of a particular communication. ND 430 may perform other actions in the communication, but process 600 concentrates on the RSVP portion of such signaling.

Process 600 may begin by receiving a resource reservation request from an end-point device [act 610]. In one implementation consistent with the principles of the invention, ND 430 may receive RSVP_PATH message 510 from EPD 440. Processing may continue by terminating the resource reservation request and assigning/committing local resources, but not assigning/committing the requested end-to-end resources [act 620]. ND 430, for example, may send return RSVP_RESV message 520 to EPD 440.

ND 430 may wait until it receives a resource coordination message from another network device [act 630] before committing the requested resources. For example, ND 430 may receive RSVP_PATH message 530 from ND 420. ND 430 may assign the resources requested by EPD 440 around this time.

Processing may continue by acknowledging the resource coordination message [act 640]. For example, ND 430 may send RSVP_RESV message 540 to ND 420. Process 600 may continue by sending a resource coordination message to the other network device [act 650]. For example, ND 430 may send RSVP_PATH message 550 to ND 420.

Although not part of process 600 that is performed by ND 430, ND 420 may assign requested resources to EPD 410 upon receiving RSVP_PATH message 550 from ND 430. This (in conjunction with a return RSVP_RESV message (not shown) from ND 420) may conclude the coordination of symmetric resource allocation between ND 420 and ND 430.

CONCLUSION

Consistent with the principles of the present invention, a network device may perform improved RSVP signaling. For example, a network device may terminate a resource request from an end-point device and wait until a coordination message from another network device. When the coordination message is received, the resources requested by the end-point device may be committed. The network device may also acknowledge the coordination message and send a coordination message of its own.

The foregoing description of embodiments of the present invention provides illustration and description, but is not intended to be exhaustive or to limit the invention to the precise form disclosed. Modifications and variations are possible in light of the above teachings or may be acquired from practice of the invention.

For example, although the above-described RSVP terminating and delaying scheme has been described with respect to a terminating network device, such as CMTS 150, such a scheme also may be performed by an originating network device (e.g., CMTS 120).

While series of acts have been described with respect to FIGS. 3A, 3B, and 6, the order of the acts may vary in other implementations consistent with the present invention. Also, non-dependent acts may be performed in parallel. Further, the acts in these figures may be implemented as instructions, or groups of instructions, in a computer-readable medium, such as an optical, magnetic, solid-state, integrated circuit, or other type of typical medium read by processors. For example, CMTS 150 and/or ND 430 may include a processor (not shown) configured to execute such instructions on the computer-readable medium to perform the acts in FIGS. 3A, 3B, and 6.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   receiving, by a device, a request for allocation of resources for transmission of data between devices,
   where the devices are different than the device;
   transmitting, by the device and before the resources have been allocated, a first message indicating that the resources have been allocated;
   receiving, by the device, a second message indicating that other resources, for the transmission of data between the devices, are to be allocated; and
   initiating, by the device, the allocation of the resources based on the second message,
   where data is transmitted between the devices based on the allocation of the resources and allocation of the other resources.

2. The method of claim 1, where the transmission of data between the devices includes execution of a peer-to-peer (P2P) application, and
   where the request is associated with a particular quality of service for the P2P application.

3. The method of claim 1, further comprising:
   receiving a third message indicating that the other resources have been allocated; and
   transmitting a fourth message indicating that the resources have been allocated based on receiving the third message.

4. The method of claim 3, where the resources are allocated prior to receiving the third message.

5. The method of claim 1, where the second message is received based on transmitting the first message.

6. The method of claim 1, where the transmission of data between the devices is part of a Voice over Internet Protocol (VoIP) session between the devices.

7. The method of claim 1, where at least one of the request, the first message, or the second message includes a resource reservation protocol (RSVP) message.

8. A system comprising:
   a device to:
   transmit a first message indicating that first resources, for transmission of data between devices, have been allocated,
   where the first message is transmitted before the first resources have been allocated, and
   where the devices are different than the device;
   receive a second message associated with allocation of second resources for the transmission of data between the devices, the second resources being different than the first resources;
   allocate the first resources based on the second message; and
   transmit a third message indicating that the first resources have been allocated,
   where data is transmitted between the devices based on allocation of the first resources and allocation of the second resources.

9. The system of claim 8, where the device is further to:
   receive a fourth message indicating that the second resources have been allocated,
   where the third message is transmitted based on receiving the fourth message.

10. The system of claim 8, where the first message is transmitted based on a request for the allocation of the first resources for the transmission of data between the devices.

11. The system of claim 8, where at least one of the first message, the second message, or the third message includes a resource reservation protocol (RSVP) message.

12. The system of claim 8, where the first message is associated with a particular quality of service for the transmission of the data between the devices.

13. A non-transitory computer-readable medium including one or more instructions, executable by at least one processor of a device, the one or more instructions comprising:
   one or more instructions to transmit a first message indicating that first resources, for transmission of data between devices, have been allocated,
   where the first message is transmitted before the first resources have been allocated, and
   where the devices are different than the device;
   one or more instructions to receive a second message indicating that second resources, for the transmission of data between the devices, are to be allocated,
   where the second resources are different than the first resources; and
   one or more instructions to allocate the first resources based on the second message,
   where the data is transmitted between the devices based on allocation of the first resources and allocation of the second resources.

14. The non-transitory computer-readable medium of claim 13, where the transmission of data between the devices is associated with at least one of a peer-to-peer (P2P) application associated with the devices or a Voice over Internet Protocol (VoIP) session between the devices,
   where the first message is associated with a particular quality of service for the at least one of the P2P application or the Voice over Internet Protocol (VoIP) session.

15. The non-transitory computer-readable medium of claim 13, further comprising:
   one or more instructions to receive a third message indicating that the second resources have been allocated; and
   one or more instructions to transmit, based on receiving the third message, a fourth message indicating that the first resources have been allocated.

16. The non-transitory computer-readable medium of claim 15, where the first resources are allocated prior to receiving the third message.

17. The non-transitory computer-readable medium of claim 13, further comprising:
   one or more instructions to receive a request for the allocation of the first resources for the transmission of data between the devices,
   where the first message is transmitted based on the request.

18. The non-transitory computer-readable medium of claim 17, where the request is associated with a particular quality of service for the transmission of data between the devices.

19. The non-transitory computer-readable medium of claim 13, where at least one of the first message or the second message includes a resource reservation protocol (RSVP) message.

20. The non-transitory computer-readable medium of claim 13, further including:

one or more instructions to receive a first RSVP_RESV message indicating that the second resources have been allocated; and one or more instructions to transmit, based on the first RSVP_RESV message, a second RSVP_RESV message indicating that the first resources have been allocated.

* * * * *